United States Patent Office 2,918,507
Patented Dec. 22, 1959

2,918,507

POLYMERIZATION OF PROPYLENE USING A THREE COMPONENT CATALYST CONTAINING SOLID METAL HALIDES AND ALUMINUM

Robert M. Kennedy, Newtown Square, and James L. Jezl, Swarthmore, Pa., assignors to Sun Oil Company, Philadelphia, Pa., a corporation of New Jersey No Drawing. Application November 29, 1957
Serial No. 699,458

4 Claims. (Cl. 260—683.15)

This invention relates to the polymerization of normally gaseous alpha-olefins to polymers which are lubricating oils having excellent temperature-viscosity characteristics.

The polymerization of olefins to hydrocarbons boiling in the lubricating oil range using, for example, Friedel-Crafts catalysts, has heretofore been described. However, such oils uniformly are of low viscosity index (V.I.), i.e., have poor temperature-viscosity characteristics. As used herein, by "V.I." is meant the change in the viscosity with temperature changes of lubricating oils as determined by ASTM method D567–41. Accordingly, such oils are not suitable for use in many applications such as for use in automobile engines.

An object of the present invention is to provide a new catalytic system especially effective for polymerizing normally gaseous alpha-olefins to high V.I. lubricating oils. A particular object is to provide a process for polymerizing normally gaseous alpha-olefins to high V.I. lubricatings oils. Other objects and their achievement in accordance with the invention will be apparent hereinafter.

It has now been found that a catalytic system prepared by admixing solid particles of a metal halide such as titanium trichloride, solid particles of an aluminum halide such as aluminum trichloride, and aluminum powder in an inert, liquid reaction medium, and contacting a normally gaseous alpha-olefin under polymerizing conditions with the so-prepared catalytic system, the alpha-olefin is rapidly polymerized to lubricating oils of high V.I.

Titanium trichloride is the preferred metal halide to employ, but other halides of the metals from groups IVa, Va, and VIa of the periodic table can be used. The metal halide employed must be in solid particulate form and be substantially insoluble in the inert, liquid reaction mediums of the invention as hereinafter described. Preferably, the metal of the metal halide is in a valence state other than its highest valence state. Such metal halides include, for example, titanium trichloride, zirconium tetrachloride, vanadium trichloride, chromium trichloride, molybdenum trichloride and the bromide and fluoride analogues thereof.

An aluminum halide is an essential component of the catalytic system. Aluminum trichloride is preferred, but aluminum tribromide and aluminum trifluoride can be used with good results.

Metallic aluminum, preferably in the form of powder or small granules, is an essential component of the catalytic system since, in the absence of aluminum, the high V.I. oils are not obtained in accordance with the invention.

For convenience, the process of the invention is largely described herein in terms of using titanium trichloride and aluminum trichloride as catalytic components of the invention.

Saturated hydrocarbons are preferably used as the inert, liquid reaction medium of the invention. Heptanes, octanes, decanes, decahydronaphthalene and homologues and mixtures thereof give good results.

The quantity of materials used to prepare the catalytic system of the invention can be varied and good results obtained. The mole ratio of titanium trichloride to aluminum trichloride can range from about 1:2 to 10:1, but preferably is above 2:1, and the mole ratio of aluminum to titanium trichloride plus aluminum trichloride can be varied from 1:5 to 10:1, but preferably is above 1:1. The total quantity of the solid catalytic components to be dispersed in the reaction mixture does not appear critical but preferably the quantity is sufficient only to prepare a light slurry, i.e., a slurry which can be readily stirred. Generally a total of one part of solid catalytic components to 10 or more parts of the liquid reaction medium will be used, but preferably a larger quantity of the reaction medium, say at least 20 parts, will be employed. No advantage is obtained by using more than about 100 parts of reaction medium per part of solid catalytic components.

Alpha-olefins which can be employed in the process are the olefins which have a terminal olefinic bond and which are normally gaseous under atmospheric conditions of temperature and pressure. Ethylene, propylene, butene-1 and mixtures thereof are the preferred alpha-olefins to employ.

The alpha-olefin can be contacted with the catalytic system by any convenient means, such as by bubbling the olefin to the catalytic system or by contacting a solution of the olefin in an inert solvent, which is preferably the same as the reaction medium, with the catalytic system.

The polymerization process occurs under relatively low temperature and pressure conditions. The temperature can be varied from about 0° C. to 200° C. but preferably is from about 80° C. to 130° C. The pressure is advantageously atmospheric pressure, but a faster rate of polymerization is obtained at mildly elevated pressures, say from about 100 to 300 p.s.i.g. (pounds per square inch gauge) and higher and even much higher pressures do not deleteriously affect the reaction.

The products of the polymerization process are characterized by having a boiling range within the lubricating oil boiling range, say from about 260° C. to 540° C. and by exhibiting a high V.I., i.e., a V.I. of above 100.

The following example illustrates the catalytic system and process of the invention in which "parts" refers to parts by weight.

Into about 53 parts of an inert, liquid reaction mixture consisting essentially of heptanes were introduced one part of aluminum trichloride particles, 1.75 parts of titanium trichloride particles and 1.51 parts of aluminum in powder form. The temperature of the resulting slurry was adjusted to 108° C. and propylene was introduced into the reactor to a pressure of 140 p.s.i.g. Mechanical agitation of the system was maintained for 9 hours during which time the temperature was maintained at substantially 108° C. and the pressure was maintained at substantially 140 p.s.i.g. by periodically introducing propylene into the reactor. After 9 hours, excess propylene was vented from the reactor and the liquid portion of the reaction mixture was separated from the solids. The reaction medium was distilled from the liquid polymer product which was then slurried with water, drained, washed and dried.

There was obtained 43 parts of a hydrocarbon oil boiling in the lubricating oil range, and having a V.I. of 116. The viscosity of the oil was 88.38 SUS (Saybolt Universal seconds) at 100° F. The oil had a bromine number of 39.5, a density of 0.8198, and an average molecular weight of about 365. No solid polymer products were obtained.

Because of its high V.I., the oil gives excellent results when used as the lubricant in an internal combustion engine. If desired, the oil can be hydrogenated to decrease the amount of unsaturation therein which increases somewhat the stability of the oil. Also, additives commonly employed in lubricating oils, such as anti-oxidants and the like can be used with good results.

When other catalytic systems within the limits herein described and when other alpha-olefins also within the limits herein described are substituted in the foregoing example, substantially equivalent results are obtained.

The invention claimed is:

1. A process for polymerizing propylene which comprises contacting, under polymerizing conditions, propylene with a catalytic system consisting essentially of a dispersion of particles of a solid halide of a metal selected from the group consisting of the metals of groups IVa, Va, and VIa of the periodic table, particles of an aluminum halide, and aluminum in an inert, liquid reaction medium, and recovering an oil product having a V.I. of above 100.

2. A process as defined by claim 1 wherein the metal halide selected is titanium trichloride.

3. A process as defined by claim 1 wherein the aluminum halide is aluminum trichloride.

4. A process as defined by claim 3 wherein the metal halide selected is titanium trichloride.

References Cited in the file of this patent

FOREIGN PATENTS

| | | |
|---|---|---|
| 363,846 | Great Britain | Dec. 31, 1931 |
| 874,215 | Germany | Apr. 20, 1953 |